(12) United States Patent
Levchenko et al.

(10) Patent No.: US 9,436,824 B1
(45) Date of Patent: Sep. 6, 2016

(54) SYSTEM AND METHOD FOR PERFORMING ANTIVIRUS SCANS OF FILES

(71) Applicant: AO Kaspersky Lab, Moscow (RU)

(72) Inventors: Vyacheslav I. Levchenko, Moscow (RU); Andrey V. Sobko, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 15/070,458

(22) Filed: Mar. 15, 2016

(30) Foreign Application Priority Data

Dec. 18, 2015 (RU) ................................ 2015154378

(51) Int. Cl.
*G06F 21/56* (2013.01)
*G06F 21/55* (2013.01)

(52) U.S. Cl.
CPC ........... *G06F 21/562* (2013.01); *G06F 21/554* (2013.01)

(58) Field of Classification Search
CPC ............................. G06F 21/562; G06F 21/554
See application file for complete search history.

(56) References Cited

U.S. PATENT DOCUMENTS

| | | | | |
|---|---|---|---|---|
| 6,735,700 B1* | 5/2004 | Flint | ....................... | G06F 21/56 713/188 |
| 7,526,516 B1* | 4/2009 | Pavlyushchik | ....... | G06F 21/554 |
| 8,312,548 B1* | 11/2012 | Cnudde | ................... | G06F 21/56 707/610 |
| 2002/0129277 A1* | 9/2002 | Caccavale | ............. | G06F 21/562 726/24 |
| 2003/0023864 A1* | 1/2003 | Muttik | ................... | H04L 63/145 726/26 |
| 2004/0068664 A1* | 4/2004 | Nachenberg | .......... | G06F 21/564 726/24 |
| 2009/0044024 A1* | 2/2009 | Oberheide | ............ | G06F 21/562 713/188 |
| 2012/0084859 A1* | 4/2012 | Radinsky | ................ | G06F 21/56 726/23 |
| 2015/0007328 A1 | 1/2015 | Zou et al. | | |
| 2015/0101049 A1* | 4/2015 | Lukacs | ................... | H04L 63/14 726/23 |
| 2016/0004864 A1* | 1/2016 | Falk | ........................ | G06F 21/56 726/23 |

OTHER PUBLICATIONS

"VirusTotal Uploader 2.0 Instantly Scans Files for Viruses Against 41 AV Apps". lifehacker.com, Dec. 15, 2009, last accessed: Jul. 12, 2016.*

* cited by examiner

*Primary Examiner* — Darren B Schwartz
(74) *Attorney, Agent, or Firm* — Arent Fox LLP; Michael Fainberg

(57) ABSTRACT

Disclosed are system and method for performing antivirus scans of files. An exemplary method includes detecting, by an antivirus application executed by a hardware processor, opening of a file for writing of data to the file; performing, by the antivirus application, antivirus scan of at least a portion of the file; when the file is determined to be clean, obtaining a record of antivirus scans of the file; determining from the record a number of performed antivirus scans on the file by the antivirus application and a maximum number of required antivirus scans; when the number of performed antivirus scans is below the maximum number of required antivirus scans, continue antivirus scans of the file by the antivirus application; and when the number of performed antivirus scan is equal to the maximum number of required antivirus scans, discontinue antivirus scans of the file by the antivirus application.

15 Claims, 3 Drawing Sheets

SYSTEM AND METHOD FOR PERFORMING ANTIVIRUS SCANS OF FILES

CROSS-REFERENCE TO RELATED APPLICATIONS

The present disclosure claims benefit of priority under 35 U.S.C. 119(a)-(d) to a Russian Application No. 2015154378 filed on Dec. 18, 2015, which is incorporated by reference herein.

FIELD OF TECHNOLOGY

The present invention relates generally to the field of computer security and, more specifically to systems and methods for performing antivirus scans of files.

BACKGROUND

Malicious and infected files often come in different sizes, ranging from few kilobytes to several gigabytes. Antivirus analysis of large files downloaded or copied via a network often significantly impacts the computer performance and the file download speed. The downloading and copying of files via a network is usually done using system file cache, located in the operating memory of the computer. The system cache has a small size, but access of the user's processes to the data of the system cache is much faster than access to the disk data. When downloading files whose size significantly exceeds the size of the system cache, the contents of the system cache need to be flushed as the system cache is filled up. The flushing of the system cache involves an operation of copying the contents of the cache to the disk and then cleaning the system cache.

Downloading of files can also be done without the system file cache, that is, with the use of a so-called "write-through", when data is written directly to the disk. However, during the write-through, the data is additionally duplicated into the cache. Furthermore, the downloading of files can be done using user's application cache, which performs the writing. In these cases, the downloading of files is done by writing to disk data blocks of small size (usually up to 64 kilobytes). To protect the data in event of system failure, after writing the next data block the file is closed for writing the data (for example, the input/output manager request IRP_MJ_CLEANUP), after which it is again opened for writing of data (the input/output manager request IRP_MJ_CREATE), and the next data block is written.

The frequency of flushing the system cache also depends on the application performing the file download. For example, different Internet browsers, file download managers and torrent clients have different file download technologies and, therefore, they may have different frequency of flushing the system cache to disk. Similarly, if an application does not use the system cache during the file download, but writes with small data blocks, as in the second example, the size of the data block may be different for different applications.

When copying a file of large size (such as more than 100 megabytes), the flushing of the system cache is done rather often. After each cache flushing operation, disk changes, and the majority of antivirus applications in this case will again perform an antivirus scan of the particular file or the altered portion of the file, i.e., the contents of the system cache. The antivirus scan of large files (for example, an installer may take up a volume of several gigabytes) may significantly increase the file download time and slow down the operation of the computer. Thus, the need arises to optimize the process of performing an antivirus scan for large files during downloading from a network. A similar situation also arises during file write-through, since the size of the data block being written to the file seldom exceeds 64 kilobytes.

SUMMARY

Disclosed are system and method for performing antivirus scans of files. The technical result is to reduce the number of antivirus scans of files during the writing of said files to the disk. One exemplary method for performing antivirus scans of files includes: detecting, by an antivirus application executed by a hardware processor, opening of a file for writing of data to the file; performing, by the antivirus application, antivirus scan of at least a portion of the file; when the file is determined to be clean, obtaining a record of antivirus scans of the file; determining from the record a number of performed antivirus scans on the file by the antivirus application and a maximum number of required antivirus scans; when the number of performed antivirus scans is below the maximum number of required antivirus scans, continue antivirus scans of the file by the antivirus application; and when the number of performed antivirus scan is equal to the maximum number of required antivirus scans, discontinue antivirus scans of the file by the antivirus application.

In one exemplary aspect, performing, by the antivirus application, antivirus scan of at least a portion of the file is performed after the writing of data to the file.

In one exemplary aspect, performing, by the antivirus application, antivirus scan of at least a portion of the file includes performing one of an asynchronous and synchronous antivirus analysis of at least a portion of the file.

In one exemplary aspect, determining the number of performed antivirus scans on the file further includes: incrementing by one the number of performed antivirus scans.

In one exemplary aspect, the method further comprises: adjusting the maximum number of required antivirus scans based one of more factors, including a size of the data written into the file and a size of the system cache.

In one exemplary aspect, the method further comprises: selecting one or more antivirus scan methods based on the number of performed antivirus scans and results of said scans.

An exemplary system for performing antivirus scans of files includes a hardware processor executing an antivirus application configured to: detect opening of a file for writing of data to the file; performing antivirus scan of at least a portion of the file; when the file is determined to be clean, obtain a record of antivirus scans of the file; determine from the record a number of performed antivirus scans on the file by the antivirus application and a maximum number of required antivirus scans; when the number of performed antivirus scans is below the maximum number of required antivirus scans, continue antivirus scans of the file; and when the number of performed antivirus scan is equal to the maximum number of required antivirus scans, discontinue antivirus scans of the file.

An exemplary non-transitory computer readable medium storing computer executable instructions for performing antivirus scans of files, includes instructions for: detecting, by an antivirus application executed by a hardware processor, opening of a file for writing of data to the file; performing, by the antivirus application, antivirus scan of at least a portion of the file; when the file is determined to be clean, obtaining a record of antivirus scans of the file; determining from the record a number of performed antivirus scans on the file by the antivirus application and a maximum number of required antivirus scans; when the number of performed antivirus scans is below the maximum number of required antivirus scans, continue antivirus scans of the file by the antivirus application; and when the number of performed antivirus scan is equal to the maximum number of required antivirus scans, discontinue antivirus scans of the file by the antivirus application.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the present invention include the features described and particularly pointed out in the claims.

BRIEF DESCRIPTION OF THE DRAWINGS

The accompanying drawings, which are incorporated into and constitute a part of this specification, illustrate one or more example aspects of the present invention and, together with the detailed description, serve to explain their principles and implementations.

DETAILED DESCRIPTION OF EXEMPLARY ASPECTS

Example aspects of the present invention are described herein in the context of a system, method, and computer program product for performing antivirus scans. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
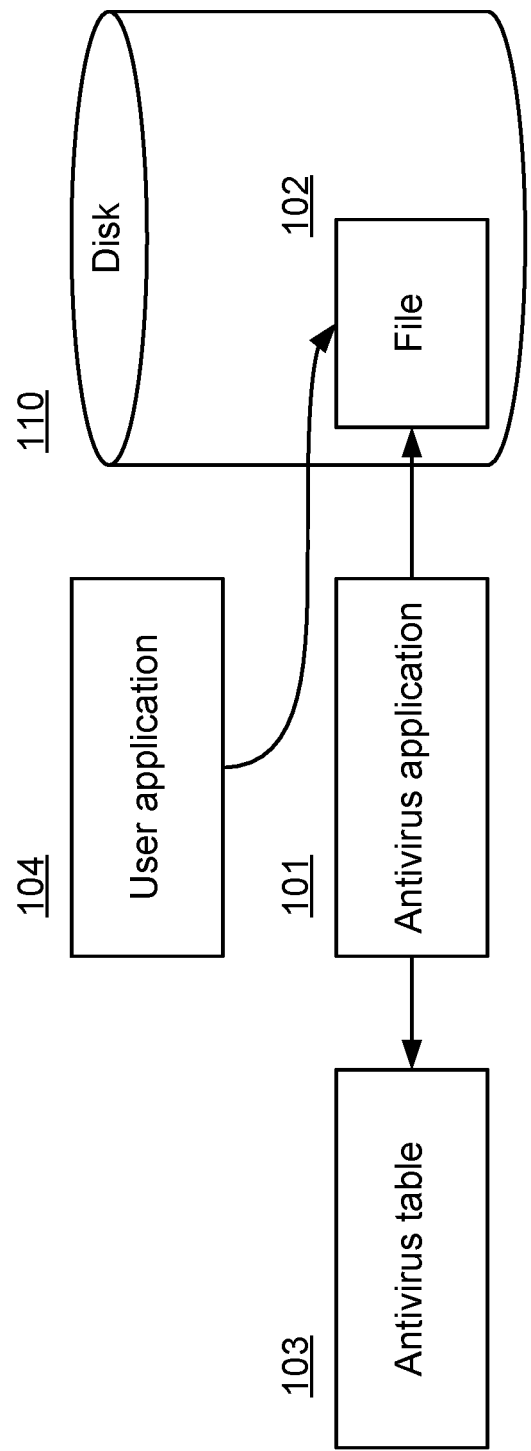
FIG. 1 illustrates a diagram of an exemplary system for performing antivirus scans.

FIG. 1 shows a diagram of an exemplary system for performing antivirus scans. The system contains an antivirus application 101, connected to an antivirus table 103 and a disk 110. The antivirus application 101 is configured to determine the operation of flushing a system cache of a file 102 to disk 110 in the process of the application of the user 104 writing the file 102 to disk 110. The file 102 may be any given file subject to an antivirus scan. For example, the antivirus scan of the file 102 will be done by the antivirus application 101 during its download from the network or during the copying of the file 102 from another data storage medium to disk 110. The antivirus application 101 is also configured to determine the operations of opening and closing of the file 102 by the application of the user 104.

Upon opening the file 102 for the writing of data, the application of the user 104 calls the function "CreateFile" with the option "FILE_SHARE_WRITE", meaning that the file 102 is open for writing of data. In the Windows operating system (OS), an Input-Output manager (I/O Manager) and a file system driver are responsible for working with files. For example, the request "IRP_MJ_CREATE" is responsible for opening a file, and "IRP_MJ_CLEANUP" for the closing. Thus, the antivirus application 101 intercepts the call of the function "CreateFile" and the request "IRP_MJ_CREATE" to determine the opening of the file 102 for the writing of data. In one exemplary aspect, for the determination of the operation of closing of the file 102, the antivirus application 101 intercepts, for example, the request "IRP_MJ_CLEANUP". In another exemplary aspect, the determination of the operation of closing the file 102 can be realized using different structures for registration of the handlers of file requests.

The determination of the operation of flushing the system cache 102 may be done by intercepting the call of the function "CcFlushCache", which is responsible for flushing the system cache to disk.

The antivirus application 101 is also configured to perform the antivirus scan of the file 102 for the presence of malicious code in the file 102, and to determine the number of previously performed antivirus scans of the file 102 by counting the number of previously performed antivirus scans in the antivirus table 103. Upon writing the next data block, the file 102 changes, and the antivirus application 101 again performs the antivirus scan of the file 102 or its altered portion (the last data block written). Confirmation of the writing of the data block of the file to disk occurs during the flushing of the system cache 102 to disk or during the file closing operation (request "IRP_MJ_CLEANUP"). Furthermore, the antivirus application 101 increases the number of antivirus scans performed per unit in the antivirus table 103 for the file 102 and performs an antivirus scan of the file 102 until such time as the increased number of scans performed exceeds a certain threshold value specified in the antivirus table 102. When the increased number of antivirus scans performed is equal to the threshold value, the antivirus application 101 ceases performing the antivirus scans of the file 102.

In one exemplary aspect, the antivirus table 103 contains the number of antivirus scans performed on portions of files or all files scanned in their entirety, especially the file 102, and a threshold value equal to the maximum number of required antivirus scans of the file 102.

Figure 2:
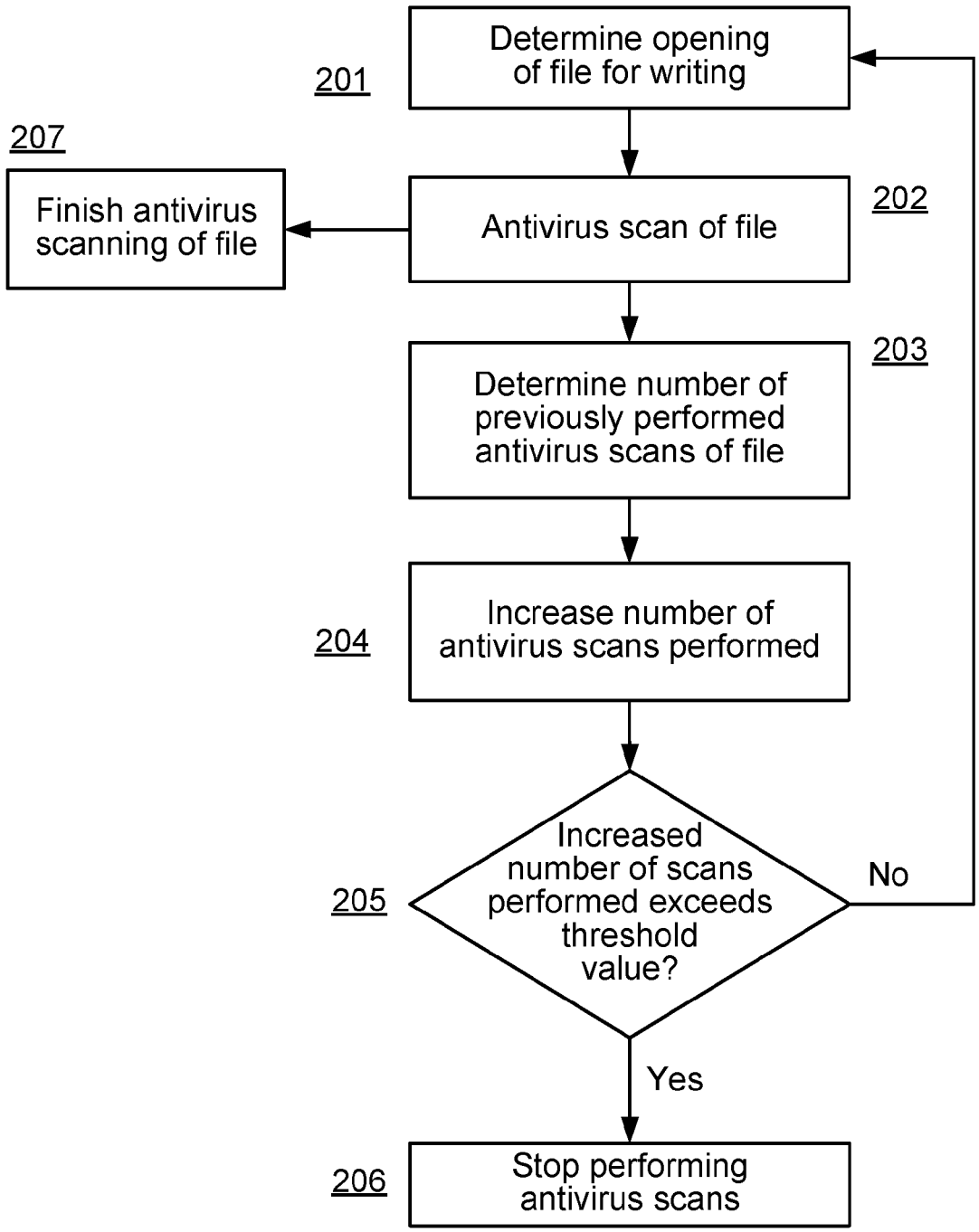
FIG. 2 illustrates a flow diagram of an exemplary method for performing antivirus scans.

FIG. 2 illustrates a flow diagram of an exemplary method for performing antivirus scans. The steps of the method may be performed by the antivirus application 101. In step 201, the antivirus application 101 determines the opening of the file 102 for the writing of data to disk 110. The writing of the file 102 to disk 110 can occur during its download from the network or during copying from another information medium to disk 110.

In step 202, antivirus application 101 performs an antivirus scan of the file 102 for the presence of malicious code after the closing of the file 102. The antivirus scan may be performed using known methods, such as the use of signature analysis, heuristic analysis, emulation, data processing in cloud services, detection using hash sums (such as MD5) and other known methods of detecting malicious code. In one exemplary aspect, the antivirus scan is done for the entire file 102. In another exemplary aspect, only the updated/modified portions of the file 102 are scanned (e.g., the last written data block).

In one exemplary aspect, in step 202, an asynchronous antivirus scan of the file 102 may be performed. That is, when performing the antivirus scan of the file 102 the opening of the file 102 for writing is not blocked by the antivirus application 101. In another exemplary aspect, in step 202 a synchronous antivirus scan of the file may be performed with blocking the opening of the file by the application of the user 104. After completion of the antivirus scan of the file 102, the antivirus application 101 transfers control to the application of the user 104.

If malicious code was found in the file 102, in step 207 the antivirus scan of the file 102 is finished, and a decision is made as to the subsequent actions with the file 102. For example, further downloading of the file 102 may be stopped, and the file 102 itself may be removed or sent to the quarantine directory of the antivirus application 101. Furthermore, the source from which the download of the file 102 is occurring may be placed on the list of untrusted sources.

But if no malicious code was found in the file 102, in step 203 the number of previously performed scans of the file 102 is determined, as indicated in the antivirus table 103. For example, if writing of data to the file 102 was done five times, and each time an antivirus scan was performed upon closing the file 102, the number of antivirus scans performed is likewise equal to five. It should be noted that the first antivirus scan of the file 102 was performed during the first closing of the file 102 after its creation on the disk 110 and the writing of the first data block. Then, in step 204, the number of antivirus scans is increased by one and the new number of antivirus scans is saved in the antivirus table 103.

In step 205, the antivirus application may determine whether the increased number of antivirus scans performed exceeds the threshold value of maximum required antivirus scans of the file. If the number of antivirus scans performed does not exceed the threshold value, the method continues in step 201. Otherwise, in step 206 the antivirus application ceases to perform the antivirus scans of the file 102 until the completion of the writing of the entire file 102 to disk or until the file 102 is opened for execution.

In one exemplary aspect, after step 206 an antivirus scan of the file can be performed if the file 102 is an executable file and is opened for execution. Whether the file 102 is executable can be determined from the header of the file 102, if the header is contained in the written data block or in the system cache.

In one exemplary aspect, the threshold value of maximum required antivirus scans of the file can be changed by the antivirus application 101 depending on the size of the data block being written or the size of the system cache. For example, if the size of the data block is rather large (for example, larger than the value set by the operating system by default), the threshold value can be decreased in proportion to the ratio of the current size of the data block and the default size of the data block. At the same time, if the size of the data block is less than the default value, the threshold value can be increased in the aforementioned proportion.

In yet another exemplary aspect, in step 203 the level of the antivirus scan is additionally assigned based on the number of previously performed antivirus scans of the file 102 and their results. The level of the antivirus scan constitutes a rule determining the methods which are used for detecting malicious code in the course of the antivirus scan. These methods may include, but not limited to, signature and heuristic analysis, emulation, code analysis using a cloud reputation service of an antivirus company, and other known methods. For example, a low level of the antivirus scan may require only a scan of the file 102 against a database of has sums of malicious files (such as MD5). For a medium level, a signature analysis may be performed in addition to the hash sum analysis, and for a high level a heuristic analysis of the file 102 may be performed in addition to the hash sum and signature analysis.

For example, a medium level of antivirus scan may be assigned by default. If in the course of heuristic analysis in the process of the antivirus scan in step 202 the presence of a potential malicious activity was detected, the level of the antivirus scan may be raised to high. At the same time, if half of the threshold value of antivirus scans of the file have already been performed, and no signs of malicious activity have been found, the level of the antivirus scan may be lowered to low in order to decrease the speed of the next antivirus scans of the file 102.

Figure 3:
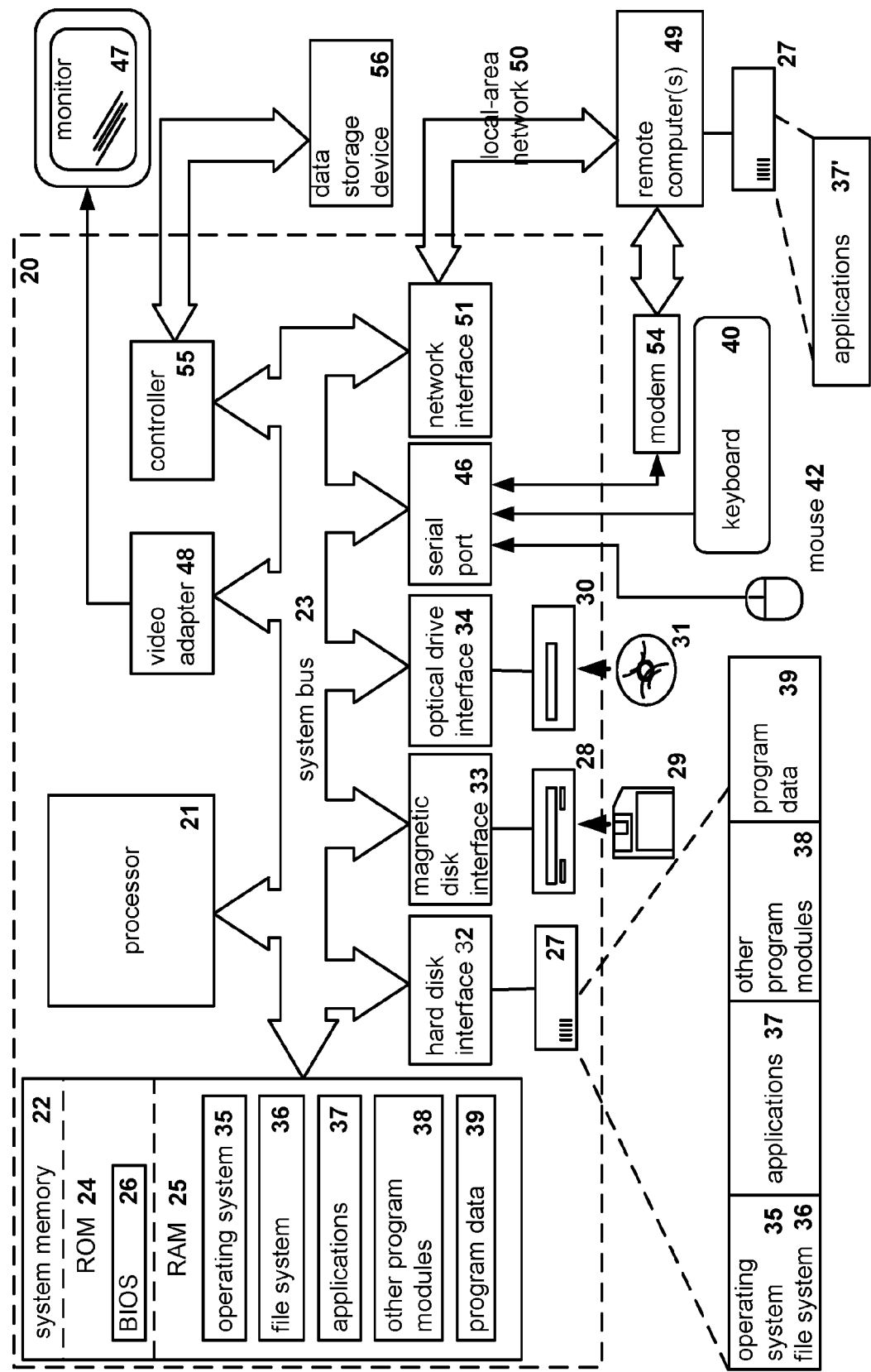
FIG. 3 illustrates an example of a general-purpose computer system by means of which the disclosed aspects of systems and method can be implemented.

FIG. 3 illustrates an example of a general-purpose computer system (which may be a personal computer or a server) on which the disclosed systems and method can be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are effectiveness-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for performing antivirus scans of files, the method comprising:
   detecting, by an antivirus application executed by a hardware processor, opening of a file for writing of data to the file;
   performing, by the antivirus application, antivirus scan of at least a portion of the file;
   when the file is determined to be clean, obtaining a record of antivirus scans of the file;
   determining from the record a number of performed antivirus scans on the file by the antivirus application and a maximum number of required antivirus scans;
   increasing by one the number of performed antivirus scans;
   when the increased number of performed antivirus scans is below the maximum number of required antivirus scans, continue antivirus scans of the file by the antivirus application; and
   when the increased number of performed antivirus scan is equal to the maximum number of required antivirus scans, discontinue antivirus scans of the file by the antivirus application.

2. The method of claim 1, wherein performing, by the antivirus application, antivirus scan of at least a portion of the file is performed after the writing of data to the file.

3. The method of claim 1, wherein performing, by the antivirus application, antivirus scan of at least a portion of the file includes performing one of an asynchronous and synchronous antivirus analysis of at least a portion of the file.

4. The method of claim 1, further comprising: adjusting the maximum number of required antivirus scans based one of more factors, including a size of the data written into the file and a size of the system cache.

5. The method of claim 1, further comprising: selecting one or more antivirus scan methods based on the number of performed antivirus scans and results of said scans.

6. A system for performing antivirus scans of files, the system comprising:
   a hardware processor executing an antivirus application configured to:
   detect opening of a file for writing of data to the file;
   performing antivirus scan of at least a portion of the file;

when the file is determined to be clean, obtain a record of antivirus scans of the file;

determine from the record a number of performed antivirus scans on the file by the antivirus application and a maximum number of required antivirus scans;

increase by one the number of performed antivirus scans;

when the increased number of performed antivirus scans is below the maximum number of required antivirus scans, continue antivirus scans of the file; and when the increased number of performed antivirus scan is equal to the maximum number of required antivirus scans, discontinue antivirus scans of the file.

7. The system of claim 6, wherein the antivirus application is further configured to perform antivirus scan of at least a portion of the file after the writing of data to the file.

8. The system of claim 6, wherein the antivirus application is configured to perform one of an asynchronous and synchronous antivirus analysis of at least a portion of the file.

9. The system of claim 6, wherein the antivirus application is further configured to adjust the maximum number of required antivirus scans based one of more factors, including a size of the data written into the file and a size of the system cache.

10. The system of claim 6, wherein the antivirus application is further configured to select one or more antivirus scan methods based on the number of performed antivirus scans and results of said scans.

11. A non-transitory computer readable medium storing computer executable instructions for performing antivirus scans of files, including instructions for:

detecting, by an antivirus application executed by a hardware processor, opening of a file for writing of data to the file;

performing, by the antivirus application, antivirus scan of at least a portion of the file;

when the file is determined to be clean, obtaining a record of antivirus scans of the file;

determining from the record a number of performed antivirus scans on the file by the antivirus application and a maximum number of required antivirus scans;

increasing by one the number of performed antivirus scans;

when the increased number of performed antivirus scans is below the maximum number of required antivirus scans, continue antivirus scans of the file by the antivirus application; and when the increased number of performed antivirus scan is equal to the maximum number of required antivirus scans, discontinue antivirus scans of the file by the antivirus application.

12. The non-transitory computer readable medium of claim 11, wherein performing, by the antivirus application, antivirus scan of at least a portion of the file is performed after the writing of data to the file.

13. The non-transitory computer readable medium of claim 11, wherein performing, by the antivirus application, antivirus scan of at least a portion of the file includes performing one of an asynchronous and synchronous antivirus analysis of at least a portion of the file.

14. The non-transitory computer readable medium of claim 11, further comprising: adjusting the maximum number of required antivirus scans based one of more factors, including a size of the data written into the file and a size of the system cache.

15. The non-transitory computer readable medium of claim 11, further comprising: selecting one or more antivirus scan methods based on the number of performed antivirus scans and results of said scans.

\* \* \* \* \*